United States Patent
Schwark, Jr. et al.

(10) Patent No.: US 8,739,515 B2
(45) Date of Patent: Jun. 3, 2014

(54) VARIABLE AREA FAN NOZZLE COWL AIRFOIL

(75) Inventors: Fred W. Schwark, Jr., Simsbury, CT (US); Oliver V. Atassi, Longmeadow, MA (US); William D. Owen, Windsor, CT (US)

(73) Assignee: United Technologies Corporation, Hartford, CT (US)

( * ) Notice: Subject to any disclaimer, the term of this patent is extended or adjusted under 35 U.S.C. 154(b) by 1005 days.

(21) Appl. No.: 12/624,491

(22) Filed: Nov. 24, 2009

(65) Prior Publication Data

US 2011/0120080 A1 May 26, 2011

(51) Int. Cl.
*F02K 1/09* (2006.01)

(52) U.S. Cl.
USPC ...... 60/226.3; 60/226.2; 60/232; 239/265.19; 239/265.31; 244/110 B (58) Field of Classification Search
USPC ............................ 60/232, 242, 770, 771, 224, 60/226.1–226.3; 416/227 R, 236 R, 235, 416/237; 239/265.19, 265.39, 265.31; 244/110 B
See application file for complete search history.

(56) References Cited

U.S. PATENT DOCUMENTS

| | | | |
|---|---|---|---|
| 2,340,417 A | 2/1944 | Ellett | |
| 3,316,714 A | 5/1967 | Smith et al. | |
| 3,820,628 A | 6/1974 | Hanson | |
| 3,820,719 A | 6/1974 | Clark | |
| 4,817,871 A * | 4/1989 | Berneuil et al. | 239/265.39 |
| 5,169,288 A | 12/1992 | Gliebe et al. | |
| 5,272,869 A | 12/1993 | Dawson et al. | |
| 5,613,649 A | 3/1997 | Schlinker et al. | |
| 6,004,095 A | 12/1999 | Waitz et al. | |
| 6,139,259 A | 10/2000 | Ho et al. | |
| 6,170,254 B1 * | 1/2001 | Cariola | 60/226.2 |
| 6,438,942 B2 | 8/2002 | Fournier | |
| 6,439,840 B1 | 8/2002 | Tse | |
| 6,789,998 B2 | 9/2004 | Chen et al. | |
| 6,905,303 B2 | 6/2005 | Liu et al. | |
| 7,018,172 B2 | 3/2006 | Prasad et al. | |
| 7,021,042 B2 * | 4/2006 | Law | 60/226.1 |
| 7,118,331 B2 | 10/2006 | Shahpar | |

(Continued)

FOREIGN PATENT DOCUMENTS

| | | | |
|---|---|---|---|
| EP | 2138696 | 12/2009 | |
| FR | 2696212 | * 4/1994 | F02K 1/74 |
| GB | 2026622 | 2/1980 | |

OTHER PUBLICATIONS

PCT International Search Report and Written Opinion, mailed Mar. 27, 2012.

(Continued)

*Primary Examiner* — Andrew Nguyen
(74) *Attorney, Agent, or Firm* — Carlson, Gaskey & Olds, P.C.

(57) ABSTRACT

A nacelle assembly for a high-bypass gas turbine engine includes a variable area fan nozzle having a first fan nacelle section and a second fan nacelle section. The second fan nacelle section being axially movable relative the first fan nacelle section to define an auxiliary port to vary a fan nozzle exit area and adjust fan bypass airflow, the second fan nacelle section includes at least one cowl with an inner portion, an outer portion and a multiple of stiffeners therebetween to increase a flutter margin.

4 Claims, 7 Drawing Sheets

(56) References Cited

U.S. PATENT DOCUMENTS

| | | |
|---|---|---|
| 7,334,998 B2 | 2/2008 | Jones et al. |
| 2004/0151585 A1* | 8/2004 | Jones .......................... 416/90 R |
| 2009/0094961 A1* | 4/2009 | Stern ............................ 60/226.3 |
| 2009/0185911 A1* | 7/2009 | Roberge ..................... 416/236 R |

OTHER PUBLICATIONS

PCT International Search Report and Written Opinion, dated Nov. 4, 2011.

* cited by examiner

VARIABLE AREA FAN NOZZLE COWL AIRFOIL

BACKGROUND

The present disclosure relates to a gas turbine engine, and more particularly to a turbofan engine having a variable area fan nozzle (VAFN) with a VAFN cowl which increases a flutter margin.

Gas turbine engines which have an engine cycle modulated with a variable area fan nozzle (VAFN) provide a smaller fan exit nozzle during cruise conditions and a larger fan exit nozzle during take-off and landing conditions.

A design requirement for the VAFN is to maintain structural integrity throughout the flight envelope of the aircraft. Due to flow turbulence and mechanical vibration, the VAFN may be subject to both tonal and broadband aerodynamic loads that cause the nozzle to elastically deflect from a mean position.

SUMMARY

A nacelle assembly for a high-bypass gas turbine engine according to an exemplary aspect of the present disclosure includes a variable area fan nozzle having a first fan nacelle section and a second fan nacelle section. The second fan nacelle section axially movable relative the first fan nacelle section to define an auxiliary port to vary a fan nozzle exit area and adjust fan bypass airflow, the second fan nacelle section includes at least one VAFN cowl with an inner portion, an outer portion and a multiple of stiffeners therebetween.

A high-bypass gas turbine engine according to an exemplary aspect of the present disclosure includes a core engine defined about an axis, a gear system driven by the core engine, a turbofan driven by the gear system about the axis, a core nacelle defined at least partially about the core engine, a fan nacelle mounted at least partially around the core nacelle to define a fan bypass flow path and a variable area fan nozzle having a first fan nacelle section and a second fan nacelle section. The second fan nacelle section axially movable relative the first fan nacelle section to define an auxiliary port to vary a fan nozzle exit area and adjust fan bypass airflow, the second fan nacelle section includes at least one VAFN cowl with an inner portion, an outer portion and a multiple of stiffeners therebetween.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
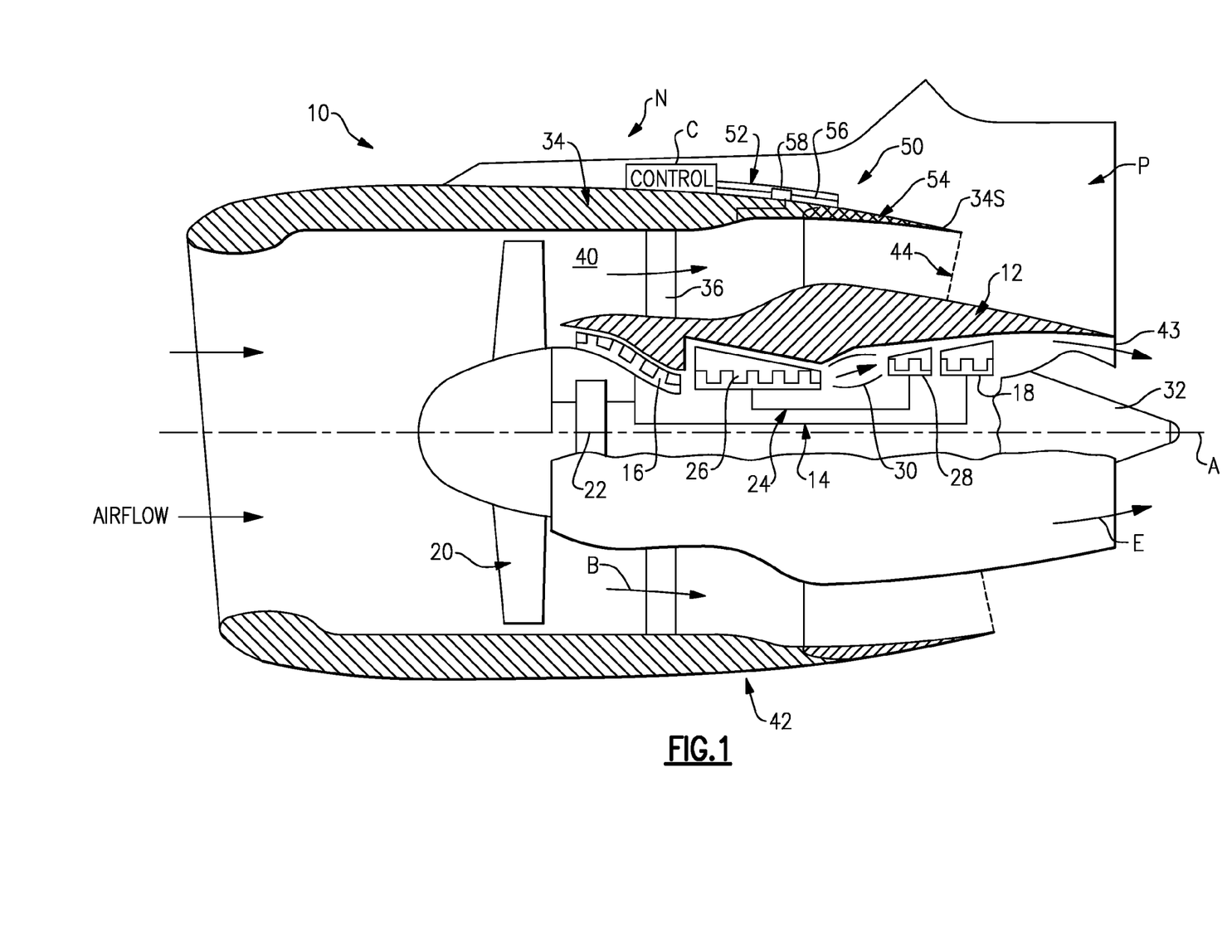
FIG. 1 is a general schematic partial fragmentary view of an exemplary gas turbine engine embodiment for use with the present invention.

FIG. 1 illustrates a general partial fragmentary schematic view of a gas turbofan engine 10 suspended from an engine pylon P within an engine nacelle assembly N. The turbofan engine 10 includes a core engine within a core nacelle 12 that houses a low spool 14 and high spool 24. The low spool 14 includes a low pressure compressor 16 and low pressure turbine 18. The low spool 14 also drives a fan section 20 through a gear train 22. The high spool 24 includes a high pressure compressor 26 and high pressure turbine 28. A combustor 30 is arranged between the high pressure compressor 26 and high pressure turbine 28. The low and high spools 14, 24 rotate about an engine axis of rotation A.

The engine 10 in one non-limiting embodiment is a high-bypass geared architecture aircraft engine with a bypass ratio greater than ten (10:1), a turbofan diameter significantly larger than that of the low pressure compressor 16, and the low pressure turbine 18 with a pressure ratio greater than 5:1. The gear train 22 may be an epicycle gear train such as a planetary gear system or other gear system with a gear reduction ratio of greater than 2.5:1. It should be understood, however, that the above parameters are only exemplary of one non-limiting embodiment of a geared architecture engine and that this disclosure is applicable to other gas turbine engines including direct drive turbofans.

Airflow enters a fan nacelle 34 which at least partially surrounds the core nacelle 12. The fan section 20 communicates airflow into the core nacelle 12 to power the low pressure compressor 16 and the high pressure compressor 26. Core airflow compressed by the low pressure compressor 16 and the high pressure compressor 26 is mixed with the fuel in the combustor 30 and expanded over the high pressure turbine 28 and low pressure turbine 18. The turbines 28, 18 are coupled for rotation with respective spools 24, 14 to rotationally drive the compressors 26, 16 and through the gear train 22, the fan section 20 in response to the expansion. A core engine exhaust E exits the core nacelle 12 through a core nozzle 43 defined between the core nacelle 12 and a tail cone 32.

The core nacelle 12 is supported within the fan nacelle 34 by circumferentially spaced structures 36 often referred to as Fan Exit Guide Vanes (FEGVs). A bypass flow path 40 is defined between the core nacelle 12 and the fan nacelle 34. The engine 10 generates a high bypass flow arrangement with a bypass ratio in which approximately eighty percent of the airflow which enters the fan nacelle 34 becomes bypass flow B. The bypass flow B communicates through the generally annular bypass flow path 40 and is discharged from the engine 10 through a variable area fan nozzle (VAFN) 42 which defines a nozzle exit area 44 between the fan nacelle 34 and the core nacelle 12 at a fan nacelle end segment 34S of the fan nacelle 34 downstream of the fan section 20.

Thrust is a function of density, velocity, and area. One or more of these parameters can be manipulated to vary the amount and direction of thrust provided by the bypass flow B. The VAFN 42 operates to effectively vary the area of the fan nozzle exit area 44 to selectively adjust the mass flow of the bypass flow B in response to a controller C. Low pressure ratio turbofans are desirable for their high propulsive efficiency. However, low pressure ratio fans may be inherently susceptible to fan stability/flutter problems at low power and low flight speeds. The VAFN 42 allows the engine to change to a more favorable fan operating line at low power, avoiding the instability region and still provide the relatively smaller nozzle area necessary to obtain a high-efficiency fan operating line at cruise speeds.

A significant amount of thrust is provided by the bypass flow B due to the high bypass ratio. The fan section 20 of the engine 10 is designed for a particular flight condition—typically cruise at 0.8M and 35,000 feet. As the fan blades within the fan section 20 are efficiently designed at a particular fixed stagger angle for an efficient cruise condition, the VAFN 42 is operated to effectively vary the fan nozzle exit area 44 to adjust fan bypass air flow such that the angle of attack or incidence on the fan blades is maintained close to the design incidence for efficient engine operation at other flight conditions, such as landing and takeoff to thus provide optimized engine operation over a range of flight conditions with respect to performance and other operational parameters such as noise levels.

Figure 2:
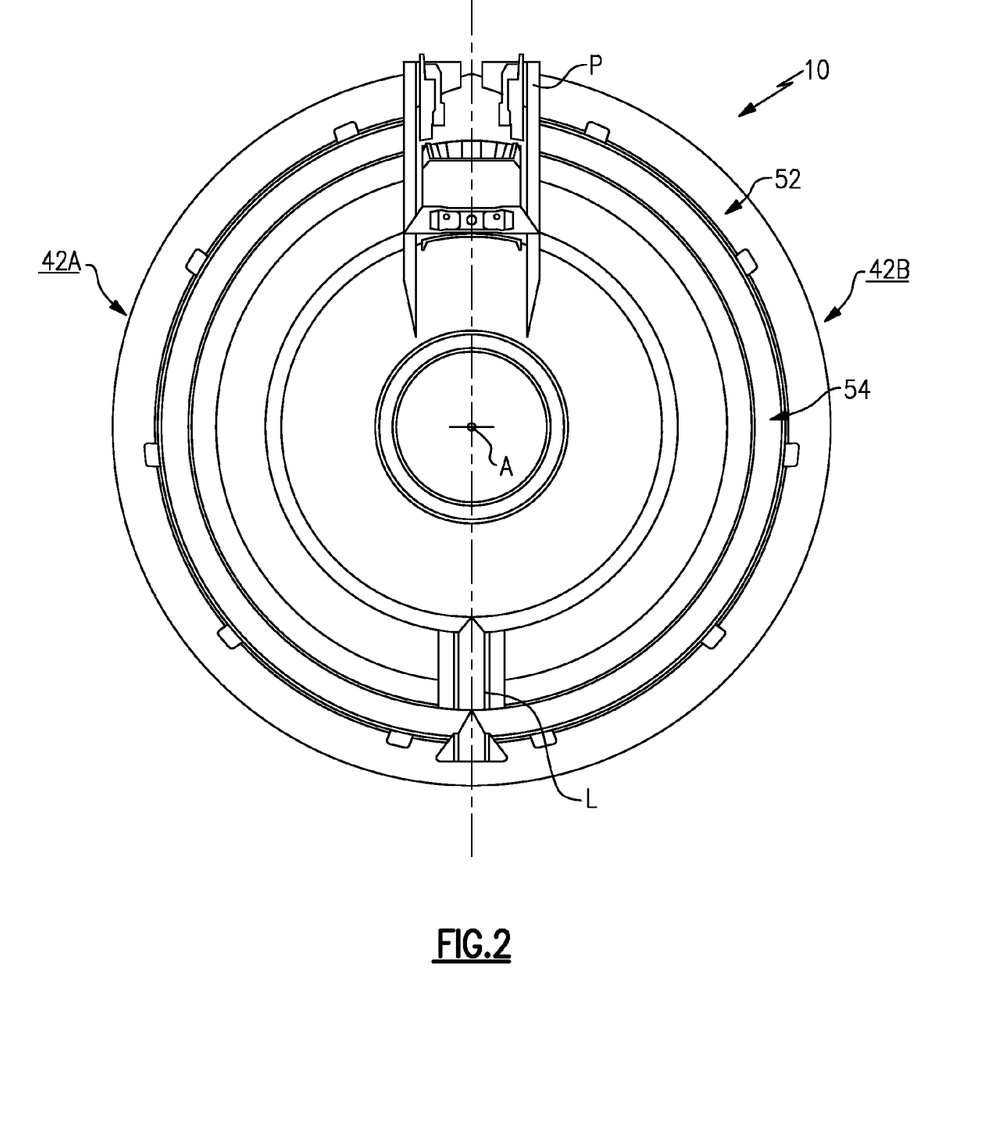
FIG. 2 is a rear view of the engine.

The VAFN 42 may be separated into at least two sectors 42A-42B (FIG. 2) defined between the pylon P and a lower Bi-Fi splitter L which typically interconnects a larger diameter fan duct reverser cowl and a smaller diameter core cowl. It should be understood that although two segments are illustrated, any number of sectors may alternatively or additionally be provided.

Figure 3A:
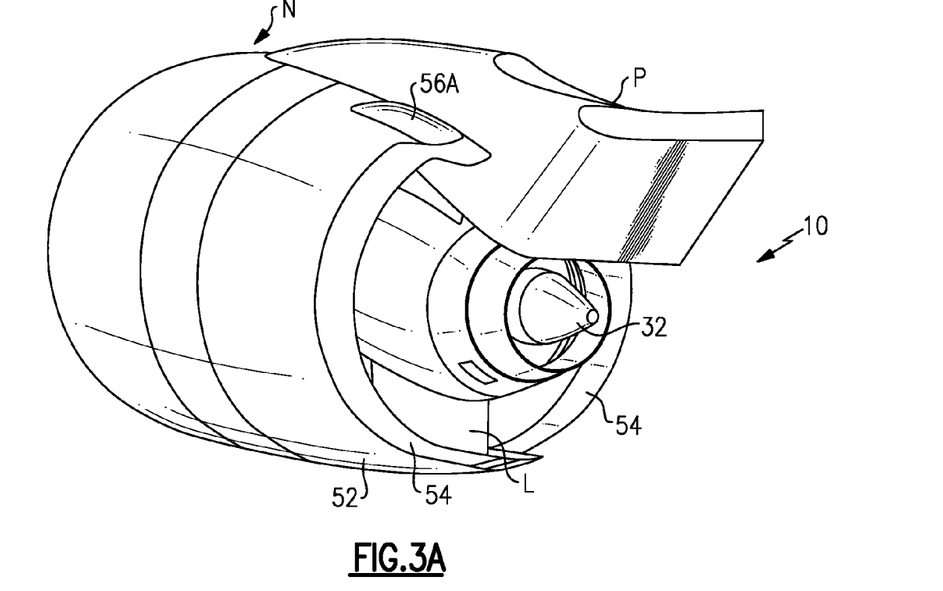
FIG. 3A is a perspective view of the engine with the VAFN in a closed position.
Figure 3B:
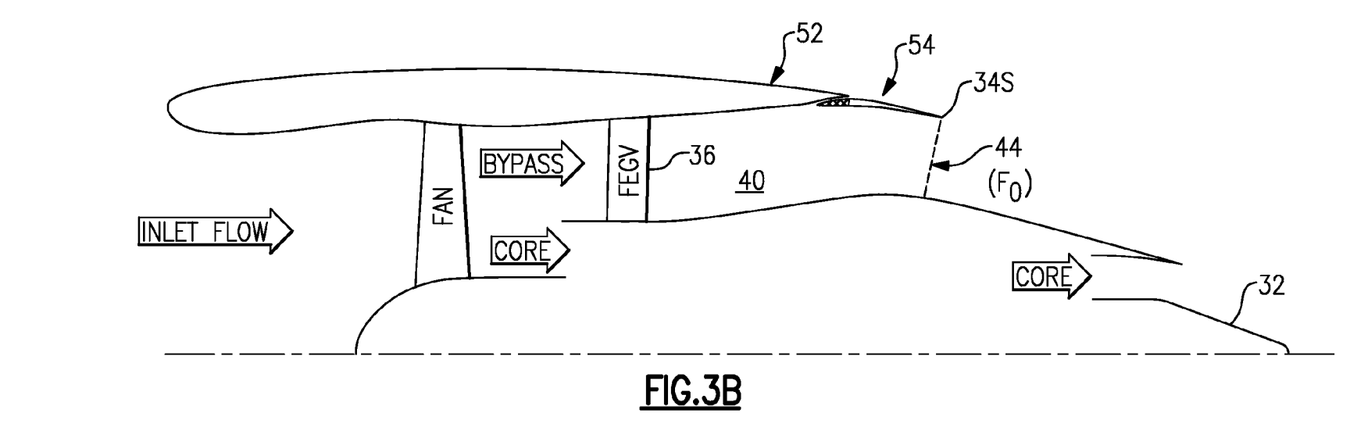
FIG. 3B is a sectional side view of the VAFN in a closed position.
Figure 4A:
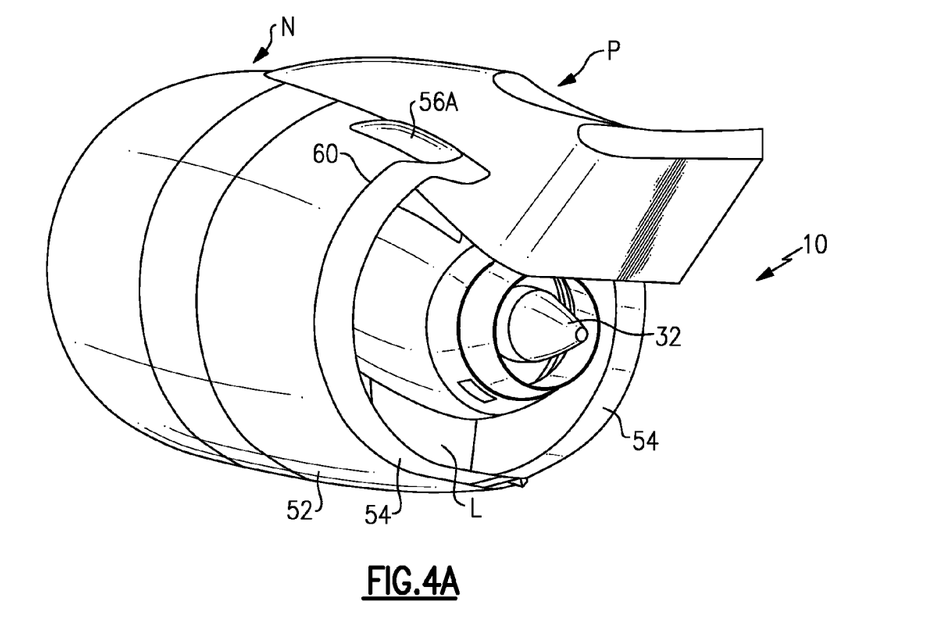
FIG. 4A is a perspective view of the engine with the VAFN in an open position.
Figure 4B:
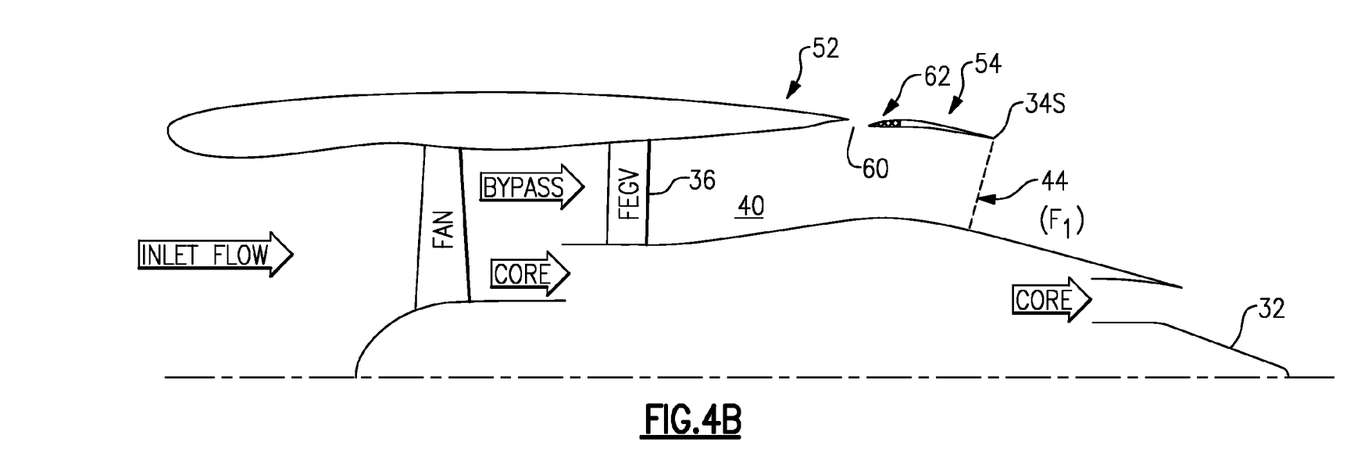
FIG. 4B is a sectional side view of the VAFN in an open position.

The VAFN 42 selectively defines an auxiliary port system 50 having a first fan nacelle section 52 that include a thrust reverser cowl and a second fan nacelle section 54 that includes a VAFN cowl movably mounted relative the first fan nacelle section 52. The second fan nacelle section 54 axially slides along the engine axis A relative the fixed first fan nacelle section 52 to change the effective area of the fan nozzle exit area 44. That is, as the stroke of the second fan nacelle section 54 varies, the leading edge of the second fan nacelle section 54 is either covered by the first fan nacelle section 52 (FIGS. 3A and 3B) or the leading edge is uncovered to define an auxiliary port 60 (FIGS. 4A and 4B).

The second fan nacelle section 54, in one non-limiting embodiment, slides along a track assembly 56A, 56B within each sectors 42A-42 (FIGS. 3A and 4A) in response to an actuator 58. The track assembly 56A, 56B may be located along the first fan nacelle section 52 adjacent the respective pylon P and the lower Bi-Fi splitter L.

Figure 5:
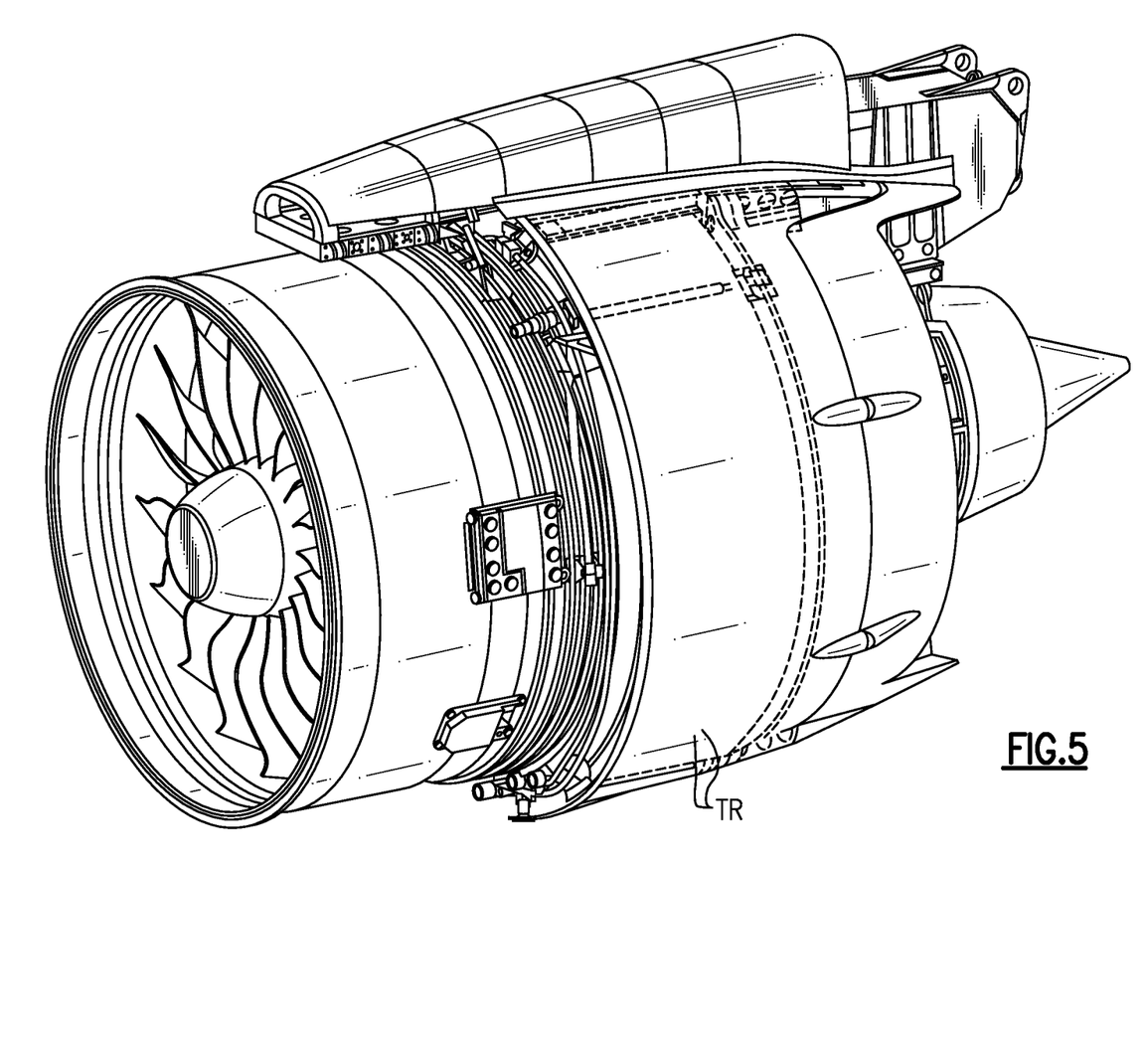
FIG. 5 is a perspective view of the thrust reverser assembly and the VAFN cowl in a closed position.
Figure 6:
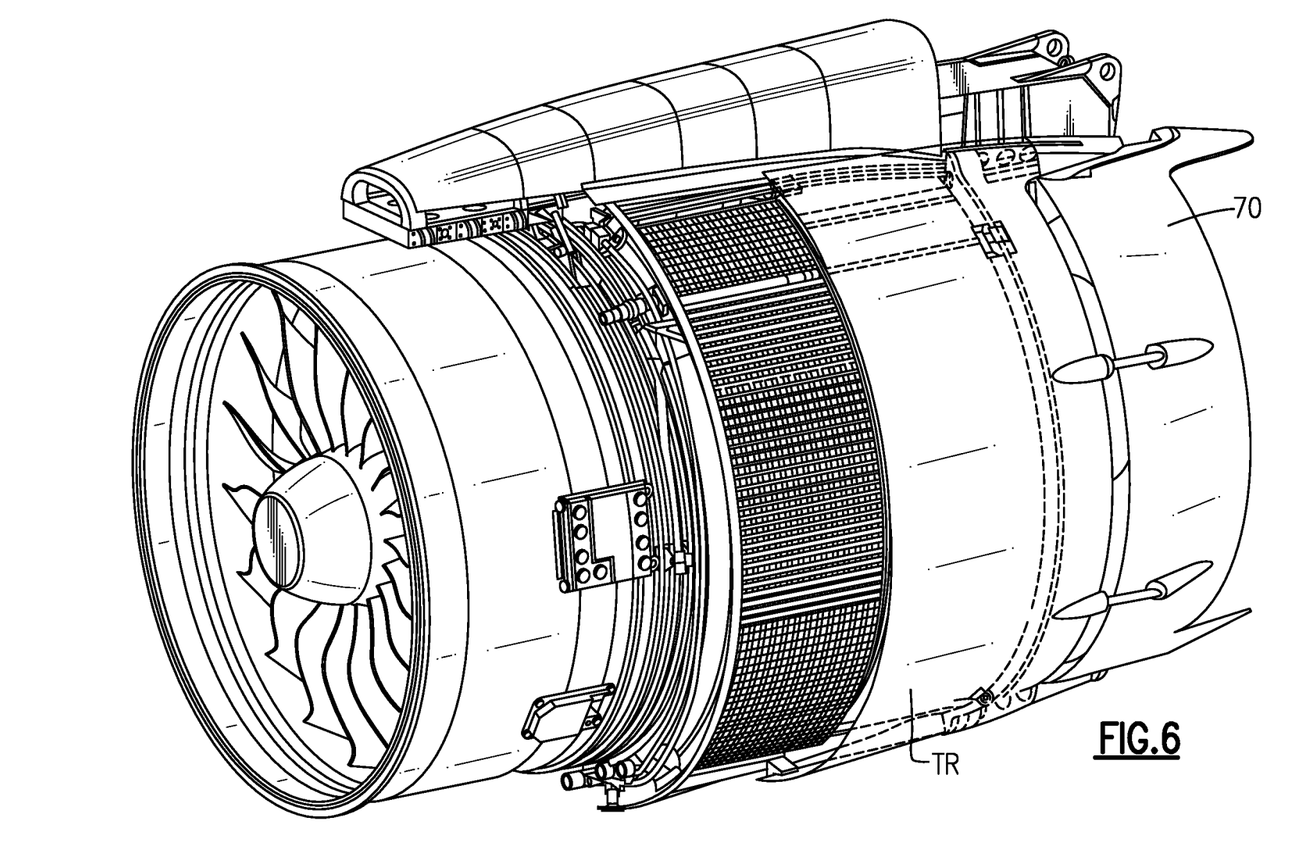
FIG. 6 is a perspective view of the thrust reverser assembly and the VAFN cowl in a translated position.

The track assembly 56A, 56B generally supports a thrust reverse cowl assembly (TR) within the first fan nacelle section 52 and a VAFN cowl 70 such that the thrust reverse cowl assembly (TR) and the VAFN cowl 70 may be operated in an independent manner. That is, the VAFN cowl 70 is movable between a closed position (FIG. 5) and an open position (FIG. 6) relative the thrust reverse cowl assembly (TR) generally along the engine axis A.

The VAFN 42 changes the physical area and geometry of the bypass flow path 40 during particular flight conditions. The bypass flow B is effectively altered by sliding of the second fan nacelle section 54 relative the first fan nacelle section 52 between a closed position (FIGS. 3A and 3B) and an open position (FIGS. 4A and 4B). Movement of the second fan nacelle section 54 forward along the track assembly 56A, 56B toward the first fan nacelle section 52 closes the auxiliary port 60 between the second fan nacelle section 54 and the first fan nacelle section 52 to essentially provide a decrease in the fan nozzle exit area 44 toward exit area F0 (FIG. 4A). Movement of the second fan nacelle section 54 aftward along the track assembly 56A, 56B away from the first fan nacelle section 52 opens the auxiliary port 60 between the second fan nacelle section 54 and the first fan nacelle section 52 to essentially provide an increased fan nozzle exit area 44 toward exit area F1 (FIG. 4B). That is, exit area F1 with auxiliary port 60 (FIG. 4B) is greater than exit area F0 (FIG. 3B).

In operation, the VAFN 42 communicates with the controller C to move the second fan nacelle section 54 relative the first fan nacelle section 52 of the auxiliary port system 50 to effectively vary the area defined by the fan nozzle exit area 44. Various control systems including an engine controller or an aircraft flight control system may also be usable with the present invention. By adjusting the axial position of the entire periphery of the second fan nacelle section 54 in which all sectors are moved simultaneously, engine thrust and fuel economy are maximized during each flight regime by varying the fan nozzle exit area. By separately adjusting the sectors of the second fan nacelle section 54 to provide an asymmetrical fan nozzle exit area 44, engine bypass flow is selectively vectored to provide, for example only, trim balance, thrust controlled maneuvering, enhanced ground operations and short field performance.

Figure 7:
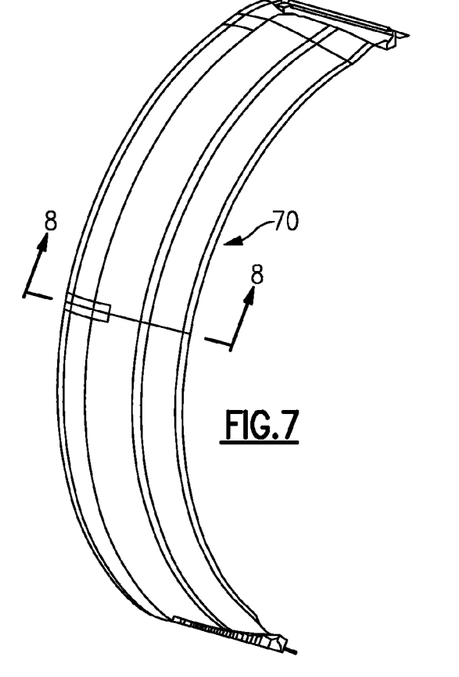
FIG. 7 is a perspective view of one VAFN cowl of the VAFN.

The second fan nacelle section 54 includes a first and second VAFN cowl 70 within each sector 42A-42B. Each VAFN cowl 70 is respectively supported by the track assembly 56A, 56B. Whereas each sector 42A-42B is essentially identical, only one VAFN cowl 70 (FIG. 7) will be described in detail herein.

Figures 8, 10, 11:
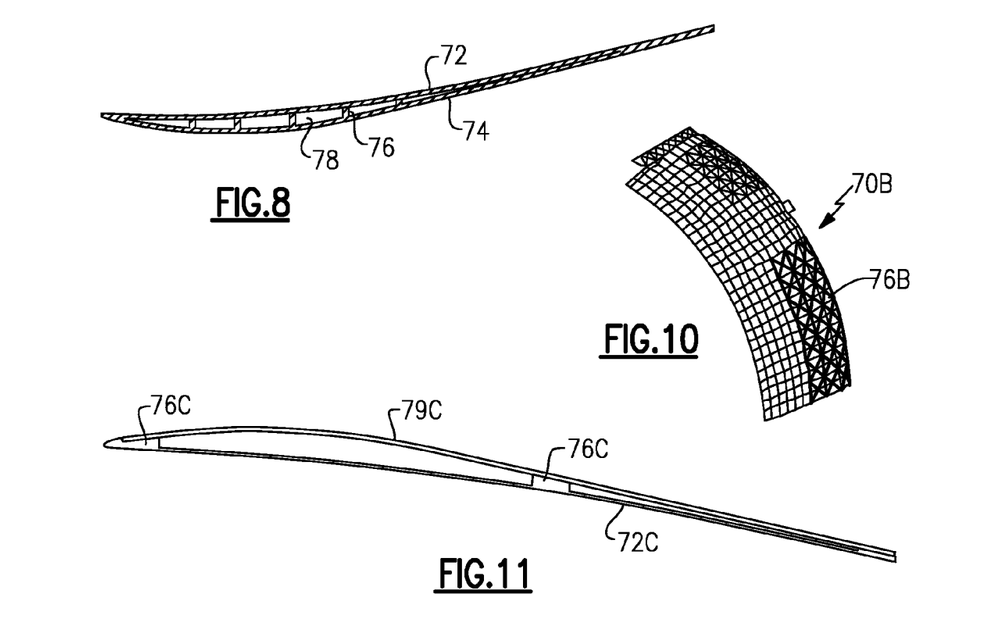
FIG. 8 is a sectional view of a non-limiting embodiment of the VAFN cowl taken along line 8-8 in FIG. 7.
FIG. 10 is a partial phantom view of another non-limiting embodiment of the VAFN cowl.
FIG. 11 is a sectional view of another non-limiting embodiment of the VAFN cowl.

Referring to FIG. 8, the VAFN cowl 70 defines an airfoil shape in cross section and may be manufactured of a metallic alloy, composite structure or combinations thereof. The VAFN cowl 70 may be constructed of an inner portion 72, an outer portion 74 and a multiple of stiffeners 76 therebetween. The multiple of stiffeners 76 may be formed integrally with the outer portion 74. Alternatively, the multiple of stiffeners 76 may be formed independently. In one non-limiting embodiment, the multiple of stiffeners 76 define five ribs along the chord of the VAFN cowl 70 within a hollow core 78. That is, the multiple of stiffeners 76 are defined around the engine axis A.

The structural response from unsteady loads upon the VAFN 42 are greatest at the resonant frequencies so that the VAFN cowl 70 is designed to withstand many cycles of this forced vibration. Moreover, under certain flow conditions the phasing between the unsteady aerodynamic loads and the displacement of the resonant modes of the structure are such that the net work of the fluid on the structure over an oscillation period is greater than zero. When this occurs, the amplitude of the deflections grows substantially over time resulting in high stress in the structure. This phenomenon is referred to as aeroelastic instability or flutter.

The multiple of stiffeners 76 stiffen the VAFN cowl 70 to modify the natural frequency and mode shape thereof which also stiffens the second fan nacelle section 54 to which the VAFN cowl 70 is slidably attached. The affect on the natural frequency and a mode shape provided by the multiple of stiffeners 76 thereby alters the aeroelastic instability or flutter of the VAFN cowl 70 to thereby effectively increase the flutter margin to substantially reduce and/or eliminate flutter within the flight envelope. That is, the multiple of stiffeners 76 are specifically arranged to reduce the modal vibration.

Figure 9:
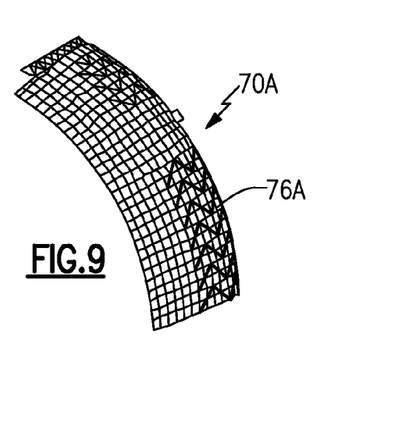
FIG. 9 is a partial phantom view of another non-limiting embodiment of the VAFN cowl.

Referring to FIG. 9, another non-limiting embodiment of a VAFN cowl 70A, includes a multiple of stiffeners 76A which are defined by chevron-shaped ribs. The VAFN cowl may be manufactured of a metallic alloy.

Referring to FIG. 10, another non-limiting embodiment of a VAFN cowl 70B includes a multiple of stiffeners 76B which are defined by an isogrid. The isogrid is a structure formed within a sheet of material such as a metallic alloy to define integral metal stiffeners in a triangular pattern.

Referring to FIG. 11, another non-limiting embodiment of a VAFN cowl 70C includes a multiple of stiffeners 76C which are manufactured from a composite material. The inner portion 72C and the outer portion 74C are defined by a multiple of layers of fabrics and tapes to form a composite skin. Each skin may be formed from 1 ply of fabric, 4 plies of tape, 1 ply of fabric, 4 plies of tape and 1 ply of fabric in a 45/0/90/0/45 orientation. It should be understood that various other arrangements and orientations may be utilized.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A nacelle assembly for a high bypass as turbine engine comprising:
    a core nacelle defined about an engine centerline axis;
    a fan nacelle mounted at least partially around said core nacelle to define a fan bypass flow path; and
    a variable area fan nozzle in communication with said fan bypass flow path, said variable area fan nozzle having a first fan nacelle section and a second fan nacelle section, said second fan nacelle section axially movable between open and closed positions relative said first fan nacelle section to define an auxiliary port to vary a fan nozzle exit area and adjust fan bypass airflow, wherein said fan nozzle exit area is an area extending radially between said second fan nacelle section and said core nacelle at a fan nacelle end segment of said second fan nacelle section, said second fan nacelle section includes at least one VAFN cowl with an inner portion, an outer portion and a multiple of stiffeners therebetween, wherein each of said multiple of stiffeners is defined by a rib, said multiple of stiffeners are located near a leading edge of said second fan nacelle section with respect to a trailing edge of said second fan nacelle section, and said second fan nacelle section is axially slideable along a track assembly in response to an actuator, said track assembly located on a radially outer surface of said first fan nacelle section.

2. The assembly as recited in claim 1, wherein said at least one VAFN cowl defines an airfoil shape in cross section.

3. The assembly as recited in claim 1, wherein said leading edge of said second fan nacelle section is covered by said first fan nacelle section at said closed position of said auxiliary port.

4. A high-bypass gas turbine engine comprising:
    a core engine defined about an axis;
    a gear system driven by said core engine;
    a turbofan driven by said gear system about said axis;
    a core nacelle defined at least partially about said core engine;
    a fan nacelle mounted at least partially around said core nacelle to define a fan bypass flow path; and
    a variable area fan nozzle in communication with said fan bypass flow path, said variable area fan nozzle having a first fan nacelle section and a second fan nacelle section, said second fan nacelle section axially movable between open and closed positions relative said first fan nacelle section to define an auxiliary port to vary a fan nozzle exit area and adjust fan bypass airflow, wherein said fan nozzle exit area is an area extending radially between said second fan nacelle section, and said core nacelle at a fan nacelle end segment of said second fan nacelle section, said second fan nacelle section includes at least one VAFN cowl with an inner portion, an outer portion and a multiple of stiffeners therebetween, wherein each of said multiple of stiffeners is defined by a rib, and wherein said multiple of stiffeners are located near a leading edge of said second fan nacelle section with respect to a trailing edge of said second fan nacelle section, said second fan nacelle section is axially slideable along a track assembly in response to an actuator, and said track assembly located on a radially outer surface of said first fan nacelle section.

* * * * *